United States Patent
Saddawi

(10) Patent No.: US 11,293,352 B2
(45) Date of Patent: Apr. 5, 2022

(54) AEROFOIL STAGNATION ZONE COOLING

(71) Applicant: ROLLS-ROYCE plc, London (GB)

(72) Inventor: Salwan D. Saddawi, Derby (GB)

(73) Assignee: Rolls-Royce plc, London (GB)

( * ) Notice: Subject to any disclaimer, the term of this patent is extended or adjusted under 35 U.S.C. 154(b) by 88 days.

(21) Appl. No.: 16/678,210

(22) Filed: Nov. 8, 2019

(65) Prior Publication Data

US 2020/0165978 A1    May 28, 2020

(30) Foreign Application Priority Data

Nov. 23, 2018   (GB) ...................... 1819064

(51) Int. Cl.
*F02C 7/36* (2006.01)
*F01D 5/12* (2006.01)

(52) U.S. Cl.
CPC ................. *F02C 7/36* (2013.01); *F01D 5/12* (2013.01); *F05D 2220/32* (2013.01); *F05D 2240/60* (2013.01)

(58) Field of Classification Search
CPC ... F02C 7/36; F01D 5/12; F01D 5/145; F01D 5/141; F05D 2220/32; F05D 2240/60; F05D 2250/294; F05D 2240/81; F05D 2240/121; F05D 2240/303; Y02T 50/60
See application file for complete search history.

(56) References Cited

U.S. PATENT DOCUMENTS

| | | | |
|---|---|---|---|
| 5,326,224 A | 7/1994 | Lee et al. | |
| 5,419,681 A | 5/1995 | Lee | |
| 5,486,093 A | 1/1996 | Auxier et al. | |
| 6,164,912 A | 12/2000 | Tabbita et al. | |
| 9,022,737 B2 | 5/2015 | Piggush et al. | |
| 2005/0135932 A1 | 6/2005 | Dodd | |
| 2006/0073015 A1 | 4/2006 | Liang | |
| 2007/0044936 A1 | 3/2007 | Memmen | |
| 2010/0040478 A1 | 2/2010 | Abdel-Messeh et al. | |
| 2013/0183165 A1 | 7/2013 | Lacy | |
| 2013/0183166 A1 | 7/2013 | Lacy | |
| 2015/0322801 A1 | 11/2015 | Slavens et al. | |
| 2016/0090847 A1 | 3/2016 | Shchukin | |

(Continued)

FOREIGN PATENT DOCUMENTS

| | | | |
|---|---|---|---|
| CN | 102312683 | 1/2012 | |
| EP | 0924384 A2 * | 6/1999 | ............. F01D 5/187 |

(Continued)

OTHER PUBLICATIONS

Great Britain search report dated May 15, 2019, issued in GB Patent Application No. 1819064.5.

(Continued)

*Primary Examiner* — Jacob M Amick
*Assistant Examiner* — Charles J Brauch
(74) *Attorney, Agent, or Firm* — Shumaker & Sieffert, P.A.

(57) ABSTRACT

An aerofoil and an aerofoil assembly, in particular an aerofoil with improved stagnation zone cooling and an aerofoil assembly comprising such an aerofoil. The aerofoil is an aerofoil for a gas turbine engine comprising a pressure surface, a suction surface, a leading edge, a trailing edge, a stagnation zone located in the region of the leading edge, and an elongate channel running along the leading edge at the stagnation zone.

14 Claims, 6 Drawing Sheets

(56) References Cited

U.S. PATENT DOCUMENTS

| | | | |
|---|---|---|---|
| 2016/0356225 A1* | 12/2016 | Sheridan | ............... F02C 7/36 |
| 2016/0363211 A1 | 12/2016 | Bradley | |

FOREIGN PATENT DOCUMENTS

| | | | | |
|---|---|---|---|---|
| EP | 0924384 | A2 | 6/1999 | |
| EP | 1013877 | | 6/2000 | |
| EP | 1467064 | A2 | 10/2004 | |
| EP | 2154333 | A2 | 2/2010 | |
| EP | 2557270 | | 2/2013 | |
| EP | 2615244 | A2 | 7/2013 | |
| EP | 2615244 | A2 * | 7/2013 | ............ F01D 5/186 |
| EP | 1655453 | | 6/2014 | |
| EP | 3118413 | A1 | 1/2017 | |
| EP | 3477054 | | 5/2019 | |
| GB | 2127105 | A * | 4/1984 | ............ F01D 5/186 |
| GB | 2127105 | A | 4/1984 | |
| GB | 2401915 | | 11/2004 | |
| JP | S5851202 | | 3/1983 | |
| WO | 2015047516 | | 4/2015 | |

OTHER PUBLICATIONS

European search report dated Jan. 16, 2020, issued in EP Patent Application No. 19205588.

Response to Extended European Search Report from counterpart EP Application No. 19205588.7 dated Jan. 21, 2020, filed Jun. 18, 2020, 38 pgs.

Communication under Rule 71(3) EPC from counterpart EP Application No. 19205588.7 dated Aug. 27, 2020, 53 pgs.

Response to Communication under Rule 71(3) EPC from counterpart EP Application No. 19205588.7 dated Aug. 27, 2020, filed Sep. 1, 2020, 36 pgs.

Communication under Rule 71(3) EPC from counterpart EP Application No. 19205588.7 dated Nov. 3, 2020, 51 pgs.

* cited by examiner

AEROFOIL STAGNATION ZONE COOLING

CROSS-REFERENCE TO RELATED APPLICATIONS

This application is based upon and claims the benefit of priority from British Patent Application No. GB 1819064.5, filed on 23 Nov. 2018, the entire contents of which are incorporated herein by reference.

BACKGROUND

Technical Field

The present disclosure relates to an aerofoil and an aerofoil assembly, in particular an aerofoil with improved stagnation zone cooling and an aerofoil assembly comprising such an aerofoil.

Description of the Related Art

Gas turbine engines typically comprise a large number of aerofoils in both the compressor and turbine. Each of the compressor and turbine may include plural rows of stationary aerofoils (stators) and moving aerofoil blades (rotors). A typical aerofoil has a leading edge which is impinged by a gas flow, a trailing edge over which the flow exits, and a pressure surface and suction surface. When gas flows across the aerofoil, the gas pressure is higher on the pressure surface than on the suction surface. When gas flow approaches the aerofoil, the flow splits either side of the aerofoil, such that some of the gas flow flows over the pressure surface, and some flows over the suction surface. The boundary at which the flow splits to flow either along the suction surface or the pressure surface is known as a stagnation zone. In other words, the stagnation zone, which is typically located in the region of the leading edge of the aerofoil, marks the boundary between the pressure surface and suction surface of the aerofoil.

The pressure surface and suction surface of an aerofoil in a gas turbine engine are typically cooled by a cooling air flow directed through cooling film holes at the leading edge, which channel cool air (or other gas) from within the blade to the surface of the blade form a cooling film, which cools the surface of the aerofoil. Typically, the stagnation zone does not have such cooling holes, so the cooling of the stagnation zone relies on air flowing inside passages located in the interior of the aerofoil.

However, because of the lack of film cooling at the stagnation zone, this zone of the aerofoil may be subject to being damaged by heat. For example, for an aerofoil which is coated with a thermal barrier coating (TBC), this coating may be damaged in the stagnation zone, which can then lead to further damage of the aerofoil, such as spallation, followed by leading edge cracking or holes being formed in the aerofoil. This may be particularly apparent for the fixed stator blades in a high pressure turbine, which are typically known as high pressure nozzle guide vanes.

It is an aim at the present disclosure to at least partially address the problems discussed above.

SUMMARY

According to a first aspect of the present disclosure there is provided an aerofoil for a gas turbine engine comprising a pressure surface, a suction surface, a leading edge, a trailing edge, a stagnation zone located in the region of the leading edge, and an elongate channel in the surface of the aerofoil running along the leading edge at the stagnation zone.

In an arrangement, the cross section of said elongate channel may vary along its length.

In an arrangement, the cross section of said elongate channel may be largest at the ends of the elongate channel, and may decrease towards the midpoint of the length of the elongate channel.

In an arrangement, at least part of the cross section of said elongate channel may be rectangular or U-shaped.

In an arrangement, the elongate channel may extend along the full length of the leading edge.

In an arrangement, the aerofoil may further comprise at least one cooling hole in the surface of the aerofoil configured to direct cooling air to said elongate channel.

In an arrangement, the cooling hole may be located in the elongate channel.

In an arrangement, the cooling hole may be located at an end of the elongate channel.

According to a second aspect of the present disclosure, there is provided an aerofoil assembly comprising the aerofoil as described above, and a first endwall. The first endwall may comprise a first cooling hole configured to direct cooling air to said elongate channel.

In an arrangement, the aerofoil assembly may further comprise a second endwall.

In an arrangement, said second endwall may comprise a second cooling hole configured to direct cooling air to said elongate channel.

According to a third aspect of the present disclosure, there is provided a gas turbine engine for an aircraft comprising an engine core comprising a turbine, a compressor, and a core shaft connecting the turbine to the compressor, a fan located upstream of the engine core, the fan comprising a plurality of fan blades; and a gearbox that receives an input from the core shaft and outputs drive to the fan so as to drive the fan at a lower rotational speed than the core shaft, wherein the turbine or the compressor includes at least one aerofoil or assembly as described above.

In an arrangement, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}$ s, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement)

for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
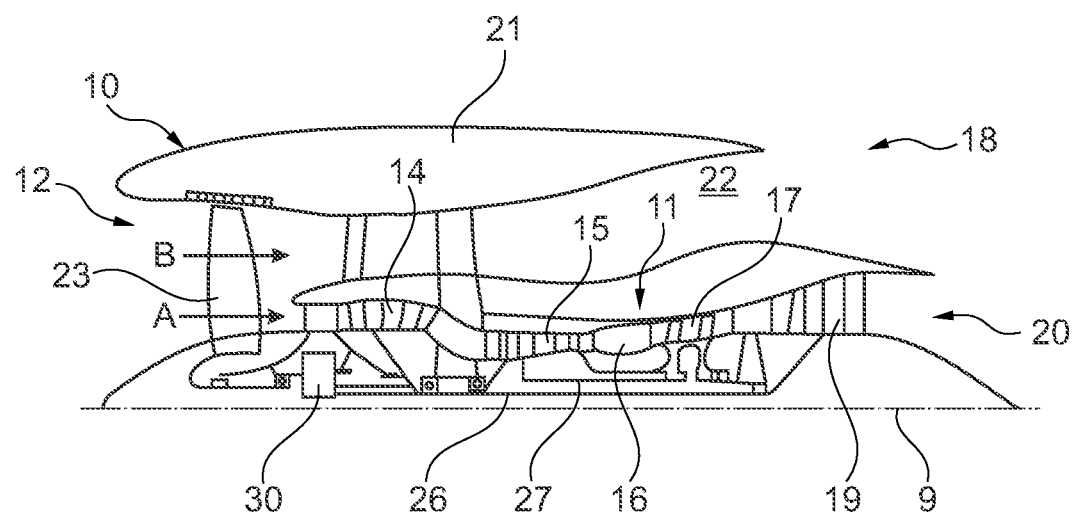
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
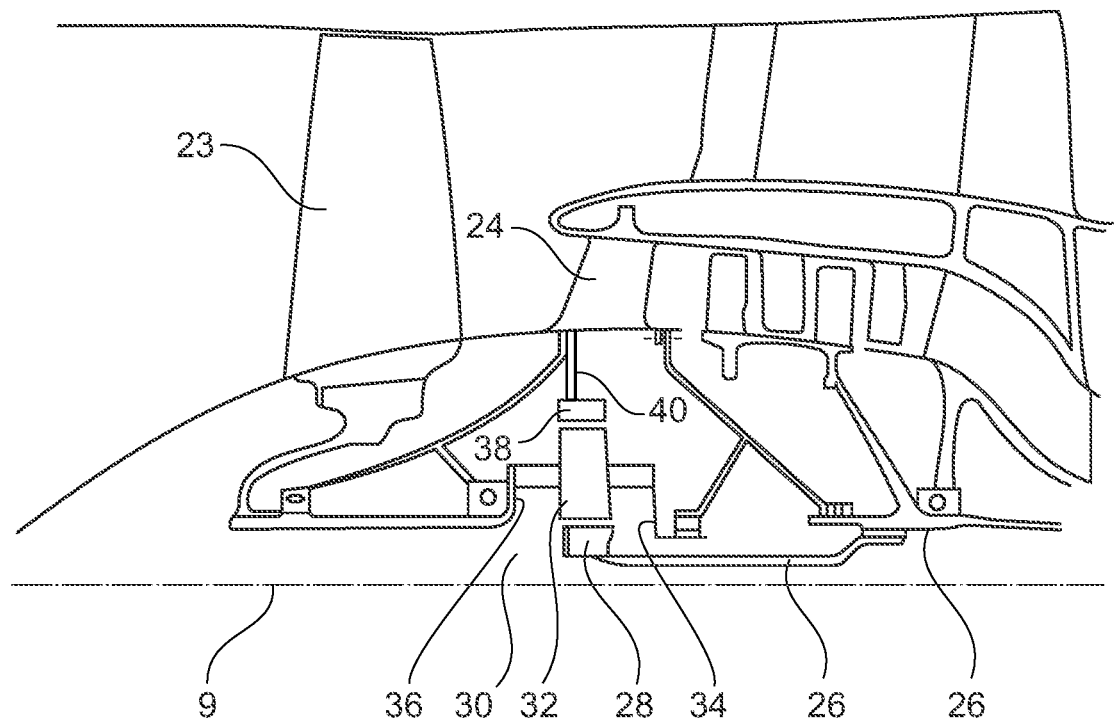
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
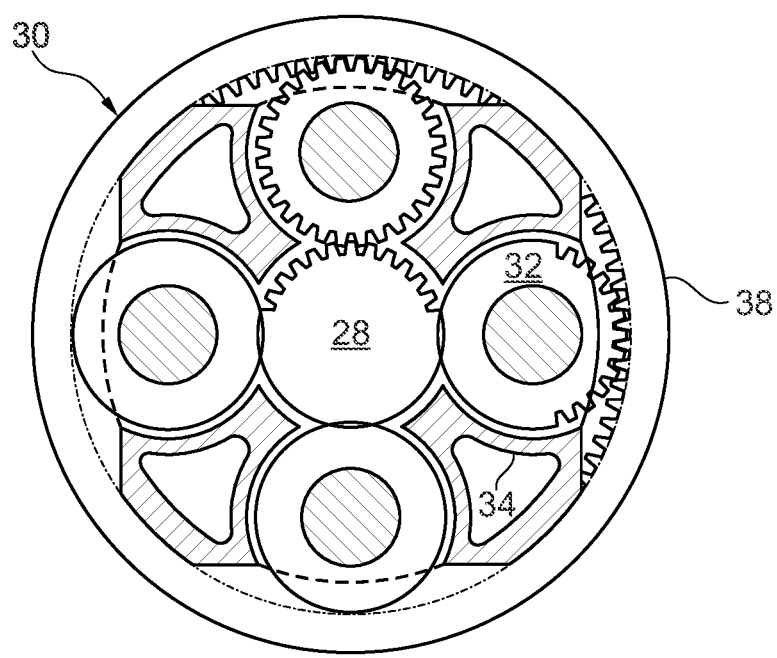
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
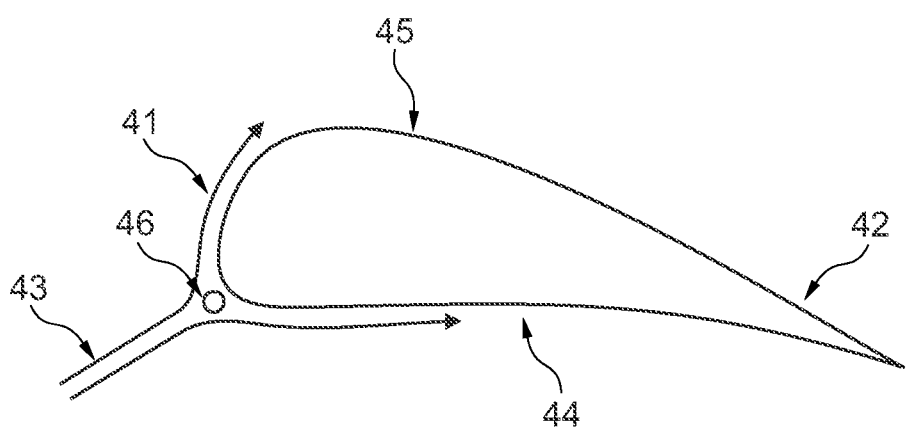
FIG. 4 shows typical flow around an aerofoil leading edge.

A typical aerofoil for use in a gas turbine, as shown in FIG. 4, has a leading edge 41 which is impinged by a gas flow 43, a trailing edge 42 over which gas flow 43 exits, a pressure surface 44 and a suction surface 45. The pressure and suction surfaces are shaped such that, in operation, the pressure in the gas flow over the pressure surface is higher than that over the suction surface, allowing the aerofoil to produce lift. When gas flow approaches the aerofoil, the flow splits either side of the aerofoil, such that some of the gas flow flows over the pressure surface 44, and some flows over the suction surface 45. The boundary on the blade at which the flow splits to flow either along the suction surface or the pressure surface is known as a stagnation point, and the area around this point is known as a stagnation zone 46. In other words, the stagnation zone 46, which is typically located in the region of the leading edge 41 of the aerofoil, marks the boundary between the pressure surface and suction surface of the aerofoil.

Figure 5:
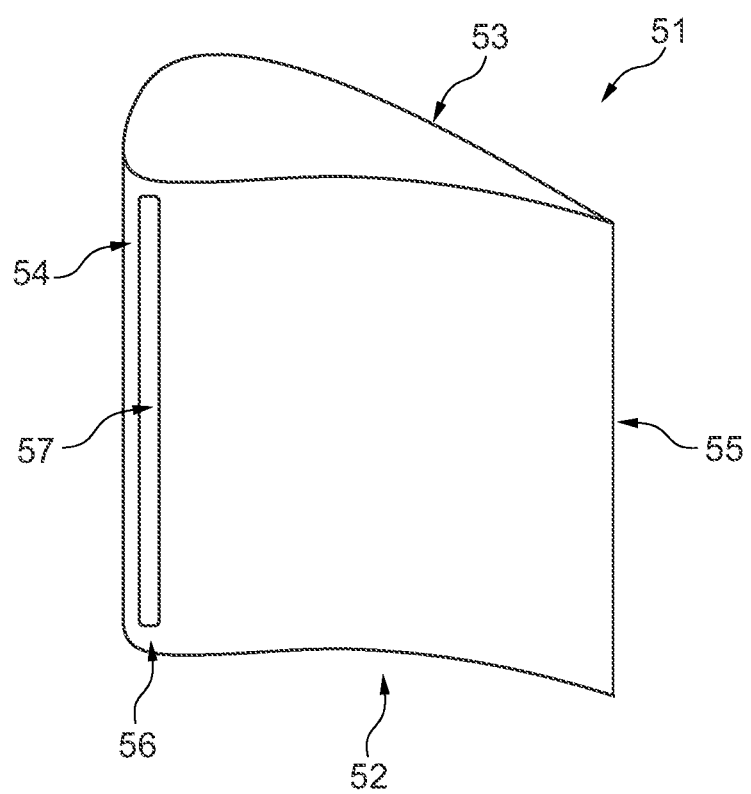
FIG. 5 is a perspective view of an aerofoil according to the present disclosure.

An aerofoil 51 according to the present disclosure and as shown in FIG. 5 comprises a pressure surface 52, a suction surface 53, a leading edge 54, a trailing edge 55, a stagnation zone 56 located in the region of the leading edge, and an elongate channel 57 provided on the surface of the aerofoil and running along the leading edge at the stagnation zone 56. The elongate channel 57, which runs along the stagnation zone 56 in the spanwise direction of the aerofoil 51, is configured to receive cooling air, which may then form a film at the stagnation zone 56, thus protecting the aerofoil surface in that region from high temperature gas flow.

When the elongate channel 57 is provided with cooling air, the cooling air moves along the channel generally parallel to the surface of the aerofoil. This may provide a film cooling effect, which provides improved cooling compared to a series of individual holes without a channel. Such a configuration may be particularly beneficial for the fixed stator blades in a high pressure turbine, which are typically known as high pressure nozzle guide vanes. These aerofoils receive gas which is at both high temperature and pressure, and may be particularly susceptible to being damaged in their stagnation zones. However, it will be understood that such a configuration could equally be applied to aerofoils which serve as rotor or stator blades in other turbines (where present) or aerofoils in compressors.

The cross-section of the elongate channel 57 may vary along its length. A change in the cross-section of the channel allows the flow of cooling gas along the channel to be controlled. For example, gas may be ejected from the channel at the point where the cross-section of the channel is smallest. After being ejected from the channel, the cooling air may then flow over the pressure surface of the aerofoil and mix with the main gas flow. It will be understood that not all of the cooling air from the channel need be ejected and flow over the pressure surface; some may also flow over the suction surface.

In some arrangements, the cross-section of the elongate channel 57 may be largest at the ends of the elongate channel 57, and decrease towards the midpoint of the length of the elongate channel. The midpoint of the elongate channel may correspond to the spanwise midpoint of the aerofoil. Thus, cooling air can be supplied at the ends of the elongate channel, flow towards the middle of the elongate channel from both ends, and be ejected from the channel at its middle. Such a change in cross-section may be achieved by varying the width and/or depth of the channel. For example, the cross-section may be of constant depth, but become narrower towards the middle of the channel, or may be of constant width and become shallower towards the middle of the channel. Or, both the width and depth of the channel may change such that its overall cross-section decreases towards its midpoint.

Although it is described above that the cooling air is ejected from the midpoint of the channel, it will be understood that the cooling air could also be ejected from other regions of the channel, such as a larger region around the midpoint of the channel. It will also be understood that cooling air could be ejected along substantially all of the length of the channel. Further, when the channel is applied to a rotor blade, the cooling air may be ejected from the elongate channel at the tip of the rotor blade.

Figure 6:
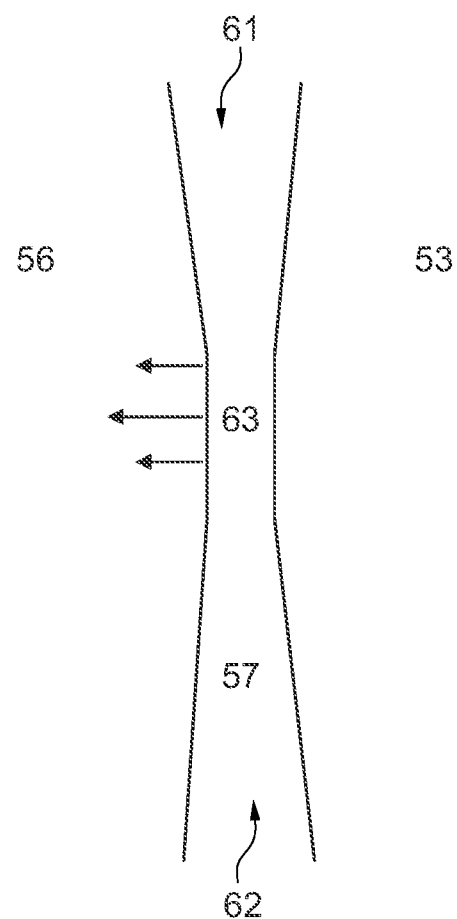
FIG. 6 is a plan view of an elongate channel according to the present disclosure.

FIG. 6 shows the shape of an elongate channel 57 of an arrangement of the present disclosure. FIG. 6 is shown as a plan view of the channel as viewed from the leading edge of the aerofoil, with the suction side 53 and pressure side 54 either side of the elongate channel 57. The width of the elongate channel 57 is largest at its two outer ends 61, 62, and narrows towards its midpoint 63. As shown in FIG. 6, cooling air is supplied to both ends 61,62 of the elongate channel 57, where the cross-section of the channel is widest. The cooling air flows to the middle of the channel, where the width of the channel is narrower than the width of the channel at the outer ends of the elongate channel. The depth of the channel can be any suitable depth, but is chosen such that the overall cross-section of the channel is smaller at its midpoint than at its ends. Thus, as described above, the flow is exhausted from the channel towards the pressure side of the aerofoil at its midpoint due to the smaller cross-section at the midpoint.

In addition to the shape of channel shown in FIG. 6, other suitable channel shapes may be used. For example, the channel may have a constant width, thus having the shape of an elongate rectangle or oval. As set out above, the cross-section of the channel may still be varied in this case by varying the depth of the channel.

The cross-sectional shape of the channel may be of any suitable shape, and may typically be at least partially rectangular or at least partially u-shaped. That is, the sides of the channel may be straight or curved. The edges of the channel (i.e. the interface where the channel meets the surface of the blade) may have a fillet applied to them. In other words, the corners of the channel may be rounded off. This may reduce stress levels and aid the application of a thermal barrier coating. The cross-sectional shape of the channel may be chosen in order to provide good cooling and flow properties, or may also be chosen to take account of its manufacturing method.

The elongate channel may be produced by any suitable manufacturing method. For example, it may be machined into the surface of the aerofoil, the aerofoil may be cast with the shape of the elongate channel in its surface, or it may be produced using a soluble core technique. The latter technique may be particularly suitable for when a shorter channel (i.e. not extending along the full span of the aerofoil) is used.

The elongate channel 57 may extend along substantially the full length of the leading edge 54 at the stagnation zone 56, as shown in FIG. 5. This may provide a high cooling capability. However, the elongate channel 57 need not extend along the entirety of the leading edge, and its length may be chosen such as to provide good cooling capability of the stagnation zone 56 even though its entire area is not provided with a channel.

Figure 7:
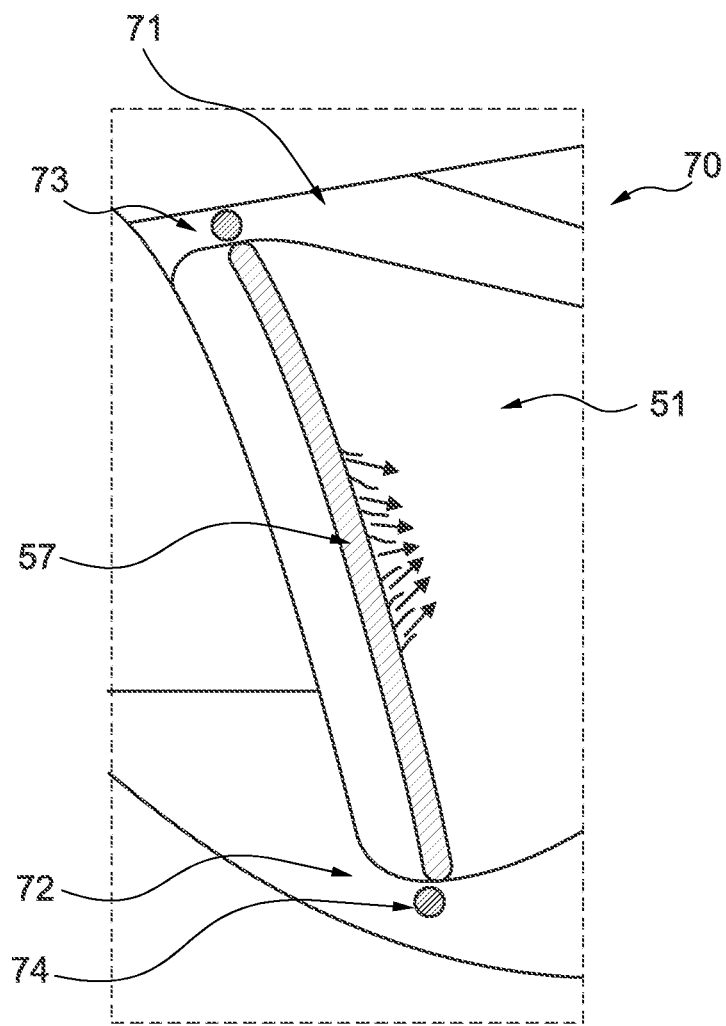
FIG. 7 is a perspective view of an aerofoil assembly according to the present disclosure.

As shown in FIG. 7, the aerofoil 51 may form part of an aerofoil assembly, where it is mounted between a first endwall 71 and a second endwall 72. Such a configuration is typical for a high pressure nozzle guide vane. When the assembly is mounted in an engine, one endwall is a radially inner endwall (in the frame of reference of the engine), and the other endwall is a radially outer endwall (in the frame of reference of the engine).

In an arrangement, the first endwall 71 is provided with a first cooling hole 73, and the second endwall 72 is provided with a second cooling hole 74. These first and second cooling holes are configured to direct cooling air to the elongate channel 57. The cooling air is supplied from the network of cooling channels which are present throughout the engine.

When the aerofoil assembly is mounted in an engine, the cooling hole which is provided in the radially inner end wall may be known as a rear inner discharge nozzle (RIDN), and the cooling hole which is located in the radially outer end wall may be known as a rear outer discharge nozzle (RODN). Thus, in such a configuration, cooling air may be supplied from both ends of the aerofoil to both ends of the elongate channel 57, and then flows along the channel to the point where it is exhausted from the channel and flows over the pressure side of the aerofoil. As described above, the point where the cooling air is exhausted from the elongate channel is typically a point at which the cross-section of the channel is smallest.

Although FIG. 7 shows an aerofoil mounted between two endwalls, with a respective hole in each respective end wall, it will be understood that two cooling holes need not be provided, and other arrangements of cooling holes are possible. For example, a single cooling hole in either of the radially inner and radially outer end walls may be provided. Likewise, when the aerofoil is not mounted between two end walls (e.g. in a rotor blade stage), a single cooling hole may be provided, for example in the hub of the rotor.

Further, in addition to the arrangements described above, the cooling holes need not be provided in an endwall, regardless of whether the aerofoil is mounted between one or two endwalls. Rather, the cooling holes may be provided in the aerofoil itself. In such an arrangement, the cooling air may be fed from a passage inside the aerofoil which carries cooling air (i.e. the passages which carry air to cool the blade from the inside). Such a configuration may be particularly suited to a moving blade in a rotor stage, where it may be difficult to supply cooling air to both ends of the elongate channel because one end is adjacent the tip of the blade.

In an arrangement, the cooling hole may be located in the elongate channel itself, at any suitable point. For example, a cooling hole may be located at one end of the channel or at the midpoint of the channel.

Likewise, multiple cooling holes may be located in the channel. For example, in an arrangement, two cooling holes may be provided, one at each end of the elongate channel. This may provide a similar flow pattern to when two cooling holes are provided in two respective end walls (i.e. the configuration shown in FIG. 7). That is, such a configuration allows cooling air to flow from the two ends of the channel towards the middle of the channel and then be exhausted from the middle of the channel.

In a further arrangement, the cooling hole may be located on the surface of the aerofoil adjacent to the elongate channel. For example, if the elongate channel does not span the length of the leading edge, one or more cooling holes may be provided at the same chordwise position as the elongate channel, outside of the elongate channel. In other words, one or more cooling holes may be provided just outside the ends of the channel along a line coincident with the direction in which the channel is elongate. Again, this may provide a similar flow pattern to when two cooling holes are provided in two respective end walls (i.e. the configuration shown in FIG. 7). That is, such a configuration allows cooling air to flow from the two ends of the channel towards the middle of the channel and then be exhausted from the middle of the channel.

It will be understood that any the arrangements of cooling holes described above are not mutually exclusive, and that any combination of the above cooling hole arrangements may be used.

It will further be understood that the exact stagnation point of a given aerofoil can vary according to its operating point (e.g. angle of attack of the gas flow etc.). However, the term "stagnation zone" as used herein is used to denote the area at which the stagnation point is located for typical operating conditions of the aerofoil. Thus, even with typical variations in flow conditions during normal operation of the engine in which the aerofoil is located, the elongate groove is positioned such that it is capable of cooling the stagnation zone (i.e. the region of the leading edge where the stagnation point is located).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An aerofoil for a gas turbine engine comprising:
   a pressure surface;
   a suction surface;
   a leading edge;
   a trailing edge;
   a stagnation zone located in the region of the leading edge; and
   an elongate channel in the surface of the aerofoil running along the leading edge at the stagnation zone, wherein a cross section of the elongate channel varies along a length of the elongate channel, wherein the cross section of the elongate channel is largest at first and second ends of the elongate channel and decreases towards a midpoint of a length of the elongate channel, and wherein the elongate channel is configured to receive cooling air only at ends of the elongate channel and eject the cooling air from the elongate channel near the midpoint of the elongate channel.

2. The aerofoil according to claim 1, wherein at least part of the cross section of the elongate channel is rectangular.

3. The aerofoil according to claim 1, wherein at least part of the cross section of the elongate channel is U-shaped.

4. The aerofoil according to claim 1, wherein the elongate channel extends along the full length of the leading edge.

5. The aerofoil according to claim 1, further comprising at least one cooling hole in the surface of the aerofoil configured to direct cooling air to the elongate channel.

6. The aerofoil according to claim 5, wherein the cooling hole is located in the elongate channel.

7. The aerofoil according to claim 6, wherein the cooling hole is located at an end of the elongate channel.

8. An aerofoil assembly comprising:
   an aerofoil comprising:
      a pressure surface;
      a suction surface;
      a leading edge;
      a trailing edge;
      a stagnation zone located in the region of the leading edge; and
      an elongate channel in the surface of the aerofoil running along the leading edge at the stagnation zone, wherein a cross section of the elongate channel varies along a length of the elongate channel, and wherein the cross section of the elongate channel is largest at first and second ends of the elongate channel and decreases towards a midpoint of a length of the elongate channel; and
   a first endwall;
   wherein the first endwall comprises a first cooling hole configured to direct cooling air to the elongate channel.

9. The aerofoil assembly according to claim 8, further comprising a second endwall.

10. The aerofoil assembly according to claim 9, wherein the second endwall comprises a second cooling hole configured to direct cooling air to the elongate channel.

11. A gas turbine engine for an aircraft comprising:
    an engine core comprising a turbine, a compressor, and a core shaft connecting the turbine to the compressor;
    a fan located upstream of the engine core, the fan comprising a plurality of fan blades; and
    a gearbox that receives an input from the core shaft and outputs drive to the fan so as to drive the fan at a lower rotational speed than the core shaft, wherein the turbine or the compressor includes at least one aerofoil or aerofoil assembly comprising:
       a pressure surface;
       a suction surface;
       a leading edge;
       a trailing edge;
       a stagnation zone located in the region of the leading edge; and
       an elongate channel in the surface of the aerofoil running along the leading edge at the stagnation zone, wherein a cross section of the elongate channel varies along a length of the elongate channel, and wherein the cross section of the elongate channel is largest at first and second ends of the elongate channel and decreases towards a midpoint of a length of the elongate channel; and
       a first endwall;
       wherein the first endwall comprises a first cooling hole configured to direct cooling air to the elongate channel.

12. The gas turbine engine according to claim 11, wherein:
    the turbine is a first turbine, the compressor is a first compressor, and the core shaft is a first core shaft;
    the engine core further comprises a second turbine, a second compressor, and a second core shaft connecting the second turbine to the second compressor; and
    the second turbine, second compressor, and second core shaft are arranged to rotate at a higher rotational speed than the first core shaft.

13. The aerofoil assembly according to claim 8, wherein the elongate channel is configured to receive cooling air only at ends of the elongate channel and eject the cooling air from the elongate channel near the midpoint of the elongate channel.

14. The gas turbine engine according to claim 11, wherein the elongate channel is configured to receive cooling air only at ends of the elongate channel and eject the cooling air from the elongate channel near the midpoint of the elongate channel.

* * * * *